3,726,690
ACIDIFIED FOOD PRODUCTS CONTAINING
XANTHOMONAS COLLOID
Harry R. Schuppner, Jr., El Cajon, Calif., assignor to
Kelco Company, San Diego, Calif.
No Drawing. Continuation-in-part of application Ser. No. 502,446, Oct. 22, 1965, now Patent No. 3,557,016, dated June 19, 1971. This application Dec. 28, 1970, Ser. No. 102,116
Int. Cl. A23g *3/00;* A23l *1/04, 1/24*
U.S. Cl. 99—139                                        7 Claims

ABSTRACT OF THE DISCLOSURE

A process for preparing an acidified food product by mixing a fat, milk solids or an edible protein, water or milk, an edible emulsifier, and a mixture of a Xanthomonas colloid and locust bean gum, heating the mixture to a temperature of about 160° F. or higher, adding an edible acid, homogenizing the mixture and sterilizing the food product. The acidified product may be canned or stored under refrigeration.

An acidified emulsion-type food product containing fat, an edible protein, flavoring ingredients and water and a mixture of a Xanthomonas colloid and locust bean gum in an effective amount to prevent or minimize serum separation from said product.

---

This application is a continuation-in-part of my earlier copending application Ser. No. 502,446 filed Oct. 22, 1965, now U.S. Pat. No. 3,557,016 issued June 19, 1971.

This invention relates to acidified food products and to a method for their preparation.

Filled or imitation sour cream, as well as acidified cream and party dips, may be manufactured by a direct acidification method, as opposed to a fermentation procedure in which lactic acid is formed in situ by lactic-acid-producing strains of bacteria. In the preparation of a food product through a direct acidification procedure, various ingredients making up the food product are first mixed together at an elevated temperature and then cooled to a relatively low temperature, such as 50° to 110° F. where an edible acid is added. Following this, the acidified product is placed into a container and maintained under refrigeration in order to prevent bacterial contamination. Such products are quite susceptible to bacterial spoilage, even when kept under refrigeration. Moreover, the above process is difficult to carry out since the cooled product must be acidified under sterile conditions to prevent bacterial contamination.

It would be desirable to provide a direct acidification process in which the acidification step could be carried out with the product being maintained at an elevated temperature such that the product could then be sterilized and canned. This would provide a simpler and more economical procedure which would not require that the food product be cooled prior to acidification. Moreover, food products prepared by such a procedure could be canned to provide products that could be stored for extended periods of time without refrigeration.

In accord with the invention, there is provided an improved procedure for the preparation of imitation or filled sour cream, acidified cream and related products by a procedure which involves the direct acidification of the food product by the addition thereto of an edible acid. The food products prepared in accordance with the invention may be canned and exhibit far greater stability than previous acidified food products which had to be stored under refrigeration.

In practicing the invention, the various food ingredients, which may include an edible protein, milk solids, fats, stabilizers, emulsifiers, flavoring ingredients, edible metal salts and water or milk are blended and heated to a temperature of about 160° F. or higher and preferably within the temperature range of about 190° to about 205° F. At this point an edible acid is added to the food mixture and the mixture is then homogenized—generally within a short period of time, such as five minutes. Following this, the food product is then sterilized and either canned or, if desired, maintained under refrigeration during storage.

In order to prevent or minimize serum separation during the process, it is essential that the food product contain from about 0.2 to about 0.6% by weight of a mixture of a Xanthomonas colloid with locust bean gum. The weight ratio of the Xanthomonas colloid to locust bean gum may range from about 20:1 to about 1:10. In the use of a mixture of Xanthomonas colloid with locust bean gum in the process, the total concentration of the mixture in the food product may be varied depending upon the ratio of the Xanthomonas colloid to locust bean gum. In general, the use of higher weight ratios of Xanthomonas colloid to locust bean gum permits the use of lower concentrations of the mixture of Xanthomonas colloid with locust bean gum. The total concentrations of a Xanthomonas colloid and locust bean gum employed in the process are quite low and the mixture provides the necessary stability to the food preparation during its processing without imparting an undesirable gummy taste to the food product.

Products which may be prepared in accord with the invention include refrigerated party dips which may be flavored, for example, with blue cheese, onion, avocado puree, garlic, etc. Imitation sour creams prepared in accordance with my invention are products which resemble cultured sour cream in their texture, flavor, and other eating qualities, but yet contain no dairy products. Rather, they contain vegetable fats which may be present in combination with milk solids. Acidified cream, as prepared according to my invention, is a term which defines products that resemble cultured sour cream in their texture, flavor and other eating qualities but in which the flavor and acidulant components are incorporated directly into the product rather than being formed in situ by bacterial fermentation. A further category of products which may be prepared in accord with my invention include cream pie fillings which contain milk solids, vegetable fats, flavorings, sugar and stabilizers. In use, such fillings may be placed into prebaked pie shells and then refrigerated for storage prior to consumption. When the products are not placed into pie shells but are consumed from a serving dish, they may be described as puddings.

In practicing the invention, the total concentration of Xanthomonas colloid and locust bean gum and the weight ratio of Xanthomonas colloid to locust bean gum may be varied depending upon the type of product which is being produced. For example, a sour cream type product requires a delicate gel structure while, on the other hand, a party dip should have good cling properties so that it will adhere to a potato chip or other type of snack item. In the case of a creamed pie filling, the product should be easily spreadable onto a prebaked pie shell, and yet, with refrigeration the filling should be sufficiently firm so that it will retain its consistency on cutting.

The term "fats" is used to define food ingredients used in my process and refers to vegetable oils, vegetable fats, animal fats, dairy fats, and mixtures thereof. By way of illustration, this term includes soy bean oil, olive oil, corn oil, coconut oil, cotton seed oil, peanut oil, sunflower seed oil, etc. The vegetable oil, may, if desired, be partially or fully hydrogenated. Further examples of fats include the use of butter, cream, and lard, etc.

The partial or complete hydrogenation of a vegetable oil changes it melting or softening point. This will have an affect upon the consistency, texture, and the eating properties of the food product. For example, in the case of a party dip, it is desirable that the texture of the product should not change markedly under refrigeration. Otherwise, refrigeration of the product would cause it to thicken to such an extent that it would no longer be suitable as a dip. Conversely, in the case of a pie filling, it is desired that the product have a consistency which changes appreciably under refrigeration. It is desired that the product become firm under refrigeration such that it can be cut and still maintain its shape.

The ratio of vegetable oils to hydrogenated oils or animal fats in the product may be varied to control the desired consistency of the product. The use of a greater quantity of vegetable oils with a lesser quantity of hydrogenated oils provides a food product whose texture undergoes less change with refrigeration, e.g., a party dip. Conversely, the use of greater quantities of hydrogenated oils with lesser quantities of vegetable oils provides a food product whose texture changes more markedly under refrigeration, e.g., a pie filling. In general, the quantity of fats, which includes vegetable oils, may range from about 1 to about 25% by weight of the food product.

Milk solids which may be employed in food products of the invention may be obtained from skimmed milk solids, buttermilk solids, buttermilk, whole milk, condensed milk, cream or any other convenient source of milk. In lieu of or in addition to milk solids, there may be present an edible protein such as sodium caseinate. The milk solids or edible protein may be present in the range of from about 2 to about 15% by weight.

Emulsifiers are present in the food products of the invention in a minor amount which typically may range from about 0.05 to about 1% by weight and preferably from about 0.20 to about 0.70% by weight. Any of the various well-known, food-grade emulsifiers may be employed, such as, the mono and diglycerides and mixtures thereof, sodium stearoyl-2-lactylate, polyoxyethylene sorbitan monostearate and other surface acting agents or emulsifiers which function to produce small oil globules dispersed in the aqueous phase of the resulting food product.

Any edible organic or inorganic acidulant may be used in the practice of the invention. By way of example ascorbic acid, lactic acid, citric acid, adipic acid, acetic acid, hydrochloric acid, phosphori acid and the like may be employed. The quantity of acidulant which is used may range from about 0.05 to about 2% by weight, depending upon the other ingredients which are present and the type of product which is being made. For example, a party dip may require a pH of about 4.3 to about 5.0 while a lemon cream pie filling may have a customary pH of about 2.7 to about 4.

An edible alkali metal salt may also be present in the food compositions within a range of about 0.05 to about 1% and preferably about 0.2% to about 0.7% by weight. This particular ingredient is an optional one and it need not be present in food compositions of the invention. Typical of appropriate alkali metal salts are sodium citrate, disodium phosphate, dicalcium phosphate, tetrasodium citrate, disodium phosphate, dicalcium phosphate, tetrasodium pyrophosphate, etc. These various salts are all known materials and they are used for their known effect in stabilizing food products which contain a high quantity of protein.

Other materials which may be present are spices or spice blends which are used primarily in party dips. As examples of spice blends there are bleu cheese, toasted onion, green onion, chili blends, etc. The usual concentration range for such ingredients is from about 0.05 to about 15% by weight depending upon the flavor desired in the food product.

Natural or artificial flavors which may be present in the food compositions include fruit powders, fruit concentrates, fruit juices, etc., such as orange, lemon, lime, cherry, peach, etc. The quantity used will depend on the type of flavoring and the degree of flavoring desired and may typically range from 0.5 to about 15% by weight. Starch is a still further optional ingredient which may, for example, be present in a pie filling to impart a starchy flavor. Any suitable modified or unmodified starch may be so employed and customary usage levels may range from about 0.05 to about 8% by weight.

In the practice of the process, as defined previously, an acidulant is added to the food composition at a temperature of about 160° F. or higher, and preferably at a temperature of about 190 to about 205° F. Following this, the food composition is homogenized. In homogenizing the food product, it may be fed through a homogenizer which customarily has two stages. Within the homogenizer, the food product may be forced under pressure between closely positioned plates and this causes the dispersion of the fatty materials of the food product within the aqueous phase of the food product. The pressure employed in the first stage of the homogenizer, may, for example, be about 500 p.s.i., while the pressure used in the second stage of the homogenizer may be considerably higher, such as about 2,000 to about 5,000 p.s.i.

After leaving the homogenizer, the food product is then sterilized. If the food product has a pH of 4.5 or less, it can be sterilized and canned by heating to 200° F. and adding it directly to the can. This is known as a "hot fill" canning process. Also, the food product may be added to the can at a temperature less than 200° F., the can sealed, and the can and its contents then retorted at a temperature sufficient to raise the contents of the can to a temperature of 200° F.

If the pH of the product is above 4.5, it may be sterilized by passage through a heat exchanger, which heats the food product to a very high temperature, e.g., 280° F., for a very short period of time. Following sterilization in this manner, the food product may be canned or it may be placed in containers and refrigerated for storage.

The Xanthomonas colloid which is employed may be illustrated by the Xanthomonas colloid produced by the bacterium *Xanthomonas campestris* which is a preferred Xanthomonas hydrophilic colloid for use in the invention.

The colloid produced by the bacterium *Xanthomonas campestris* is a polymer containing mannose, glucose, potassium glucuronate and acetyl radicals. In such a colloid, the potassium portion can be replaced by several other cations without substantial change in the properties of the colloid for my purpose. The said colloid is a high molecular weight, exocellular material which may be prepared by the bacterium *Xanthomonas campestris* by whole culture fermentation of a medium containing 2–5% commercial glucose, an organic nitrogen source, dipotassium hydrogen phosphate and appropriate trace elements under aerobic conditions. The colloid may be recovered by precipitation with methanol from the fermentation mixture.

Xanthomonas colloids may also be prepared by repeating the above described fermentation procedure by substituting known *Xanthomonas* organisms, i.e., *Xanthomonas carotae*, *Xanthomonas incanae*, *Xanthomonas begoniae*, and *Xanthomonas malvacearum*, for the bacterium *Xanthomonas campestris*.

To further illustrate the invention, there are presented the following examples in which all parts and percentages are by weight unless otherwise indicated:

EXAMPLE I

| | Percent |
|---|---|
| *Xanthomonas campestris* colloid | 0.200 |
| Locust bean gum | 0.020 |
| Emulsifier | 0.500 |
| Hydrogenated vegetable oil | 13.750 |
| Vegetable oil | 5.700 |
| Skim milk solids | 10.000 |
| Lactic acid | 0.900 |
| Flavors | 0.290 |
| Sodium citrate | 0.200 |
| Water | 68.440 |

In forming the above composition, the solid ingredients were dry blended and were then added to the water at about room temperature. The composition was then heated to about 110° F. or higher with mixing and the fat and/or oil was then added. Following this, the ingredients were heated to about 190° F., at which point the acid was added. After acidification, the food product was run through a homogenizer, was sterilized and was placed into cans.

EXAMPLE II

Canned party dip

| | Percent |
|---|---|
| *Xanthomonas campestris* colloid | 0.20 |
| Locust bean gum | 0.02 |
| Emulsifier | 0.50 |
| Hydrogenated vegetable fat | 12.75 |
| Vegetable oil | 5.70 |
| Skim milk solids | 10.00 |
| Lactic acid | 0.90 |
| Sodium citrate | 0.20 |
| Flavors | 0.29 |
| Dip spice mix | 5.32 |
| Water | 64.14 |

The above ingredients were processed by the procedure described in Example I to provide a satisfactory canned party dip.

EXAMPLE III

Canned filled sour cream

| | Percent |
|---|---|
| *Xanthomonas campestris* colloid | 0.200 |
| Locust bean gum | 0.020 |
| Hydrogenated vegetable fat | 11.750 |
| Vegetable oil | 5.700 |
| Lactic acid | 0.900 |
| Flavors | 0.290 |
| Skim milk solids | 10.000 |
| Modified waxy maize starch | 2.000 |
| Emulsifier | 0.500 |
| Sodium citrate | 0.200 |
| Water | 68.440 |

The above ingredients in the amounts indicated were processed according to the procedure described in Example I to provide a satisfactory canned filled sour cream.

EXAMPLE IV

Refrigerated filled sour cream

| | Percent |
|---|---|
| *Xanthomonas campestris* colloid | 0.30 |
| Locust bean gum | 0.08 |
| Modified waxy maize starch | 2.00 |
| Hydrogenated vegetable fat | 14.00 |
| Skim milk solids | 10.00 |
| Citric acid | 0.40 |
| Emulsifier | 0.50 |
| Water | 69.10 |

In forming a refrigerated filled sour cream, the above ingredients were processed in the manner described in Example I up to and including the step of sterilization. Following sterilization, the food composition was then immediately packaged and refrigerated for storage.

EXAMPLE V

Using the procedure described in Example I, the following ingredients, in the amounts indicated, were processed to form a very satisfactory canned acidified cream:

| | Percent |
|---|---|
| *Xanthomonas campestris* colloid | 0.20 |
| Locust bean gum | 0.02 |
| 20% cream | 63.90 |
| Skim milk solids | 5.80 |
| Emulsifier | 0.50 |
| Lactic acid | 0.90 |
| Sodium citrate | 0.20 |
| Flavors | 0.29 |
| Water | 28.28 |

EXAMPLE VI

To illustrate the application of the process to the preparation of a pie filling, the following ingredients in the amounts indicated were processed in the manner described in Example I to form a canned black cherry pie filling.

| | Percent |
|---|---|
| *Xanthomonas campestris* colloid | 0.25 |
| Locust bean gum | 0.02 |
| Hydrogenated vegetable fat | 10.50 |
| Emulsifier | 0.30 |
| Vegetable oil | 4.50 |
| Citric acid | 0.55 |
| Ascorbic acid | 0.10 |
| Skim milk solids | 7.50 |
| Sugar | 16.50 |
| Salt | 0.10 |
| Sodium hexametaphosphate | 0.60 |
| Black cherry concentrate (60% solids) | 6.50 |
| Water | 52.57 |

EXAMPLE VII

Using the procedure of Example VI, the following ingredients in the amounts indicated were processed to form a canned cream cheese filling:

| | Percent |
|---|---|
| *Xanthomonas campestris* colloid | 0.20 |
| Locust bean gum | 0.01 |
| Hydrogenated vegetable fat | 19.75 |
| Emulsifier | 0.50 |
| Butter milk solids | 6.50 |
| Sugar | 13.60 |
| Lactic acid | 0.80 |
| Cream cheese | 6.50 |
| Flavors | 0.12 |
| Water | 50.83 |

EXAMPLE VIII

A canned cottage cheese cake filling was prepared using the general procedure described in Example I and the following ingredients in the amounts indicated:

| | Percent |
|---|---|
| *Xanthomonas campestris* colloid | 0.16 |
| Locust beam gum | 0.01 |
| Hydrogenated vegetable fat | 7.00 |
| Emulsifier | 0.50 |
| Buttermilk solids | 8.00 |
| Sugar | 16.00 |
| Dry curd cottage cheese | 7.00 |
| Modified corn starch | 2.25 |
| Lactic acid | 0.60 |
| Flavors | 0.15 |
| Water | 58.33 |

EXAMPLE IX

Banana lemon cream pile filling

| | Percent |
|---|---|
| *Xanthomonas campestris* colloid | 0.25 |
| Locust bean gum | 0.02 |
| Hydrogenated vegetable oil | 10.00 |
| Emulsifier | .30 |
| Buttermilk solids | 5.00 |
| Sugar | 20.00 |
| Salt | 0.25 |
| Lemon powder | 1.50 |
| Banana flakes | 6.50 |
| Phosphoric acid | 0.05 |
| Water | 56.13 |

The above ingredients in the amounts indicated were processed according to the procedure described in Example I. The product had excellent taste and stability.

EXAMPLE X

| | Percent |
|---|---|
| *Xanthomonas campestris* colloid | 0.25 |
| Locust bean gum | 0.02 |
| Hydrogenated vegetable fat | 11.50 |
| Vegetable oil | 2.00 |
| Emulsifier | 0.30 |
| Buttermilk solids | 7.00 |
| Sugar | 20.00 |
| Egg yolk | 1.70 |
| Salt | 0.25 |
| Lemon powder | 1.40 |
| Modified corn starch | 2.00 |
| Citric acid | 0.50 |
| Water | 53.08 |

The above ingredients were processed in the general manner described in Example I to provide an excellent lemon cream pie filling. The filling had good spreadability but set up nicely under refrigeration to provide a firm textured filling.

The water content of the various food products will vary depending on the nature of the particular food product. In general the water content will range from about 40 to about 60 percent by weight. The water may be added as such or it may be present in the food ingredients used, for example, in milk.

As described in the foregoing examples, the invention provides a variety of food products having improved stability by direct acidification of the food product under elevated temperatures followed by homogenization and sterilization. The products may be either canned or stored under refrigeration.

I claim:

1. A process for preparing an acidified food product, said process comprising mixing fats, milk solids or an edible protein, a minor amount of an edible emulsifier and water, together with a Xanthomonas colloid locust bean gum at a weight ratio of Xanthomonas colloid to locust bean gum ranging from about 20:1 to about 1:10 with the concentration of Xanthomonas colloid and locust bean gum ranging from about 0.2 to about 0.6 percent by weight of said food product in an amount sufficient to prevent or minimize serum separation from said food product; heating the mixture of food ingredients to a temperature from about 160° F. up to the boiling point of the mixture, adding an edible acidulant to said hot mixture at the temperature at which it is heated and homogenizing said acidulated hot mixture.

2. The process of claim 1 wherein the quantity of the edible acidulant ranges from about 0.05 to about 2 percent by weight of said food product.

3. The process of claim 1 including the step of canning said homogenized mixture and sterilizing said canned mixture.

4. The process of claim 1 wherein said food product contains from about 1 to about 25 percent by weight of fats, about 2 to about 15 percent by weight of milk solids or an edible protein, and about 0.05 to about one percent of an edible emulsifier.

5. The process of claim 4 wherein said food product contains from about 0.05 to about one percent of an edible alkali metal salt protein stabilizer.

6. The process of claim 1 wherein said mixture of food ingredients is heated to about 190° to about 205° F. before the addition of said edible acidulant.

7. The process of claim 1 wherein said Xanthomonas colloid is *Xanthomonas campestris* colloid.

References Cited

UNITED STATES PATENTS

| | | | |
|---|---|---|---|
| 3,067,038 | 12/1962 | O'Connell | 99—144 |
| 3,314,801 | 4/1967 | Cadmus et al. | 99—139 |
| 3,359,116 | 12/1967 | Little | 99—144 |
| 3,557,016 | 1/1971 | Schuppner | 252—316 |
| 3,507,664 | 4/1970 | Schuppner | 99—131 |
| 3,539,363 | 11/1970 | Morgan | 99—59 |
| 3,370,955 | 2/1968 | Little | 99—54 |
| 3,314,798 | 4/1967 | Graves | 99—59 |
| 3,437,494 | 4/1969 | Loter | 99—54 |
| 3,391,002 | 7/1968 | Little | 99—54 |
| 3,355,298 | 11/1967 | Loter | 99—54 |

NORMAN YUDKOFF, Primary Examiner

U.S. Cl. X.R.

99—214, 144, 150